United States Patent Office 3,454,862
Patented July 8, 1969

3,454,862
RECTIFYING APPARATUS FOR PRODUCING A CONSTANT DC OUTPUT VOLTAGE
Toshio Kurimura and Kazuomi Yamamura, Tokyo-to, and Tsuneo Murahashi, Tokorozawa-shi, Japan, assignors to Kokusai Denshin Denwa Kabushiki Kaisha, Tokyo-to, Japan, a joint-stock company of Japan
Filed July 3, 1967, Ser. No. 650,937
Claims priority, application Japan, July 8, 1966, 41/44,108
Int. Cl. H02m 1/08, 7/20
U.S. Cl. 321—18                                 15 Claims

ABSTRACT OF THE DISCLOSURE

A rectifying apparatus for producing a constant DC output voltage from AC power under regulation of at least one electronic switching element, where the firing angle of the electronic switching element is regulated by use of ignition signals generated in response to changes of saturation conditions of a group of saturable reactors which are included in another rectifying circuit excited by the AC power and connected respectively to a group of rectifying elements of another rectifying circuit regulated by use of a reference DC voltage source, the group of rectifying elements being impossible to be conductive at the same time as to one another.

This invention relates to rectifying apparatus for regulating the DC output by use of, as regulation elements, electronic switching elements, such as silicon controlled rectifiers (SCR), bidirectional thyristor, switching transistor or thyratron, and more particularly to such rectifying apparatus for supplying a constant DC output voltage from an AC voltage in which apparatus a regulable rectifying circuit using saturable reactors (SR) as regulation element is employed as the ignition circuit of the electronic switching elements (CS).

As the ignition circuit of the electronic switching elements used for regulating the rectified output, so-called electronic circuits, such as pulse generation circuits employing transistors or vacuum tubes etc. and pulse generation circuits employing unijunction transistors etc., are generally used. However, since the constitution of the ignition circuit in such devices is usually complicated, the number of constructive parts is considerably large so that this increase of the number of parts becomes a factor to reduce the reliability of the entire device. Although the reliability of the entire device is particularly important in a rectifying apparatus of large power, transient currents or voltages caused by transient phenomena occurring in the device or from the outside of the device exceed frequently the limited value in view of the current or voltage characteristic of the above-mentioned electronic circuit for the ignition circuit. As the result of this phenomena, the reliability of the device will be more reduced. Moreover, if the firing angles of electronic switching elements corresponding to respective phases of AC voltage are mutually unbalanced in case of regulating a multi-phase alternating-current by use of the electronic switching elements, DC components are produced in alternating-currents at a certain case. In this case, since the direct-current resistance of an AC circuit is almost zero, over current so rashes in the AC circuit that the parts of the AC circuit are damaged, and ripple voltages included in the rectified output increase in some cases. In the ignition circuit using conventional electronic circuits, it is very difficult to balance the firing angles of respective phases, and a lot of time is necessary to adjust the device.

It is an object of this invention to remove the above-mentioned deficiencies of the conventional apparatus and to provide a constant DC output rectifying apparatus which is highly reliable and easily adjustable.

Another object of this invention is to provide a constant DC output rectifying apparatus which is realizable of a highpower device with a light weight.

Further object of this invention is to provide a constant DC output rectifying apparatus having a very short response time.

It is a characteristic feature of this invention attainable of the above-mentioned object or objects that a rectifying circuit using saturable reactors as regulation elements is employed for igniting electronic switching elements of a constant DC output rectifying apparatus using the electronic switching elements, said ignition being carried out by use of the abrupt change of the current of the saturable reactor occurring at a transition instant from non-saturation to saturation of the saturable reactor, and that a difference voltage between a reference DC voltage and the rectified DC output voltage from the rectifying apparatus using the electronic switching elements or a voltage proportional to the rectified DC output voltage is applied to a control circuit to regulate the demagnetization current of the saturable reactor so as to adjust the saturation phase position of the saturable reactor, whereby the above-mentioned ignition angle of the electronic switching element is regulated.

The novel features of this invention are set forth with particularity in the appended claims, however, this invention, as to its construction and operation together with other objects and advantages thereof, may best be understood by reference to the following description, taken in connection with the accompanying drawings, in which, equivalent parts are designated by the same symbol and the same reference numeral as to one another; and in which:

Figure 1:
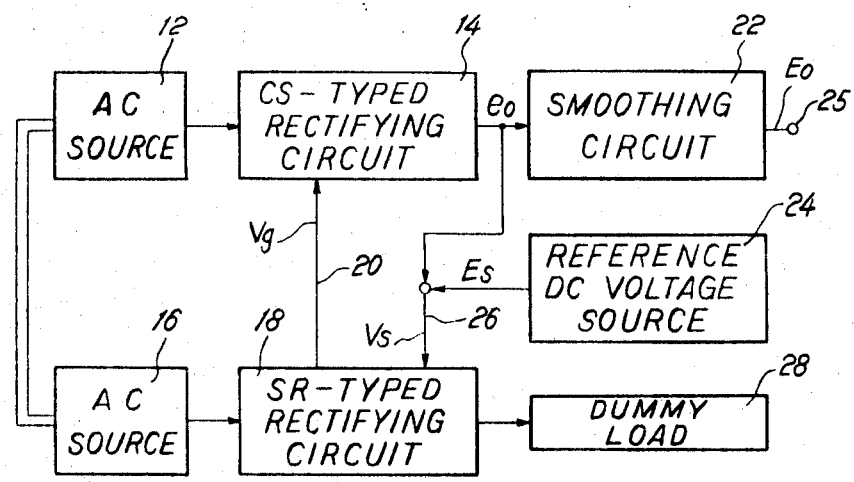
FIGURE 1 is a block-diagram for illustrating the constructive principle of the apparatus of this invention.

The constitutional principle of the rectifying apparatus of this invention will first be described with reference to FIGURE 1. An AC voltage source 12 supplies AC power to a rectifying circuit 14 using electronic switching elements (hereinafter referred as "CS typed rectifying circuit"). An AC voltage source 16 supplies AC power to a rectifying circuit 18 using saturable reactors (hereinafter referred as "SR typed rectifying circuit"). In this case, a single AC source (not shown) supplies AC power to both of the AC sources 12 and 16 so that the AC power from the sources 12 and 14 has the same frequency and the same phase angle. An ignition signal $Vg$ derived from the SR typed rectifying circuit 18 is applied through a line 20 to the CS typed rectifying circuit 14. A difference voltage between a voltage proportional to the rectified output voltage $e_0$ and a reference DC voltage $Es$ of a reference DC voltage source 24 is applied, through a line 26, to the control input of the SR typed rectifying circuit 18 as a control signal $V_5$. A DC output voltage $E_o$ regulated to a constant value is obtained at the output terminal 25 of a smoothing circuit 22. Although the rectified output of the SR typed rectifying circuit 18 appears across a dummy load 28, the power consumption in the dummy load 28 is suppressed at a minimum value as far as the ignition signal $Vg$ is obtained at a sufficient level. In general, the control signal $Vs$ is directly applied to the control winding of the SR typed rectifying circuit. Abrupt change of a voltage across a resistor connected to the main winding of the saturable reactor or the output of a pulse transformer connected in series with the main winding of the saturable reactor or the like signal is employed as the ignition signal $Vg$. In the arrangement shown in FIGURE 1, the voltage supplied from the AC source 16 may be determined irrespective of the output voltage of the AC source 12. In other words, the voltage from the AC source 16 is determined so as to make the design of the SR-typed rectifying circuit easy. Accordingly, the voltage from the AC source 16 has usually a value nearly equal to 100 volts (R.M.S.) even if the voltage from the AC source 12 has a high value or a low value. However, if necessary, it may be allowable that the AC source 12 and the AC source 16 form a single AC source. The details of the operation of the apparatus will be described below with respect to respective embodiments.

An embodiment of this invention applied to form a single-phase full-wave rectifying circuit will be now described with reference to FIGURE 2A. AC power is applied to a primary winding 32 of a transformer 30. AC voltages respectively across secondary windings 34 and 36 are rectified through silicon controlled rectifiers (SCR) 38 and 40 and applied, through a winding 44 of a choke-coil 42, to a load 46. A smoothing condenser 48 is connected in parallel with the load 46. In order to ignite the silicon controlled rectifiers 38 and 40, a SR typed rectifying circuit is provided in which AC voltages across secondary windings 50 and 52 are applied respectively to series connections of a rectifier 54 and a main winding 58 of a saturable reactor 92 and of a rectifier 56 and a main winding 60 of a saturable reactor 94 to regulate them by the reactors 92 and 94 and the rectified outputs are then respectively divided by resistors 62 and 64 and by resistors 66 and 68, whereby the ignition signals $Ig$ are respectively applied to control electrodes 70 and 72 of the silicon controlled rectifiers 38 and 40. The silicon controlled rectifier 38 or 40 is ignited when the current ($Ig$) flowing through the resistor 64 or 68 increases abruptly in response to the saturation of corresponding one of the saturable reactor 92 or 94. All currents flowing through the resistors 62, 64, 66 and 68 return to a neutral point of the secondary winding of the transformer 30 through a resistor 74. The DC output voltage $Eo$ across output terminals 78 and 80 and the reference DC voltage $Es$ of a reference DC voltage source 82 are added in the opposite sense. As the practical result, a voltage $e_{01}$ proportional to the rectified DC output $e_0$ is differentially superposed on the reference DC voltage $Es$, and a difference voltage between said voltages $e_{01}$ and $Es$ is applied, as the control signal $Vs$, to a series-connection of auxiliary windings 88 and 90 of the saturable reactor 92 and 94. In other words, an auxiliary winding 86 of the choke-coil 42 and control windings 88 and 90 of the saturable reactors 92 and 94 are connected in series to one another and terminals of the series connected windings 86, 88 and 90 are connected respectively to terminals 78 and 84 so that the saturable reactors 92 and 94 are demagnetized in accordance with the increase of the voltage across terminals 78 and 84. A rectifier 95 is employed for flowing the rectified current to the main winding 44 of the choke-coil 42 in case of cutting off periods of the silicon controlled rectifiers 38 and 40.

Figure 2A:
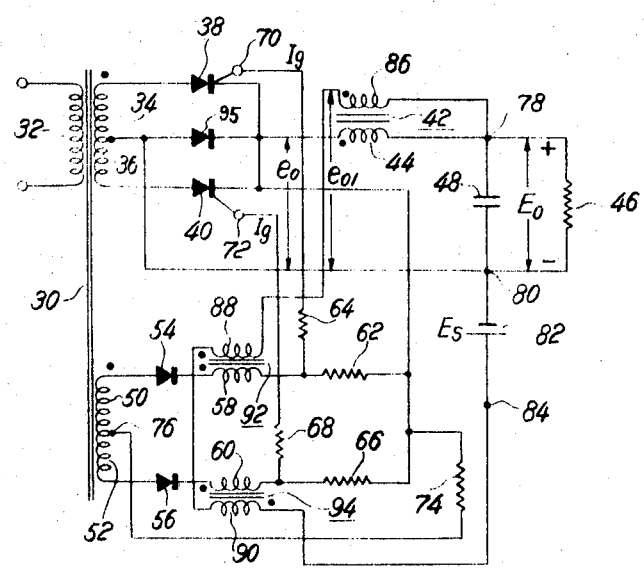
FIGURES 2A and 3 are connection-diagrams for illustrating respectively embodiments of this invention applied to form a single-phase full-wave rectifying circuit.

Operation of the embodiment shown in FIGURE 2A will be now described. When the AC voltage is applied to the primary winding 32 of the transformer 30, AC voltages appear at the respective secondary windings 34, 36, 50 and 52. In this case, since the saturable reactors 92 and 94 reach their saturation conditions due to the reference DC voltage $Es$, the ignition current $Ig$ having a sufficient amplitude flows either the resistance 64 or 68 so that either the controlled rectifier 38 or 40 connected to the secondary winding 34 or 36 being the same phase as the current $Ig$ becomes conductive. In a half cycle succeeding to this period, the similar operation is carried out and the voltage $e_{01}$ increases. When the average value (i.e., $Eo$) of the voltage $e_{01}$ increases up to a value exceeding slightly the reference DC voltage $Es$, demagnetizations of the saturable reactors 92 and 94 is started by a control circuit (86, 88, 90 and 82). At this time, since the ignition current $Ig$ sufficient to ignite the silicon controlled rectifier 38 or 40 is not induced across the rectifier 54 or 56 in the non-saturation periods of the saturable reactors 92 and 94 even if AC voltages appear at the secondary windings 50 and 52, conductions of the silicon controlled rectifiers 38 and 40 is delayed until the saturable reactors 92 and 94 reach to their saturation conditions. Accordingly, the DC output voltage $Eo$ shows a tendency to decrease and is stabilized at a value substantially equal to the reference DC voltage $Es$.

As understood from the above-mentioned formation and operation, the following control loop is provided to stabilize the average value $Eo$ of the rectified DC output $e_0$:

$Eo \rightarrow Es \rightarrow$ the control signal $Vs \rightarrow$ the SR typed rectifying circuit $\rightarrow$ the ignition signal $Vg \rightarrow$ the CS typed rectifying circuit $\rightarrow$ the smoothing circuit $\rightarrow Eo$. In this arrangement, since the stability of the control system is liable to be disturbed by the phase-delay of the control loop resulting from the smoothing circuit (the choke-coil 42 and the condenser 48), the phase delay is compensated by providing with the auxiliary winding 86 at the choke-coil 42.

Figure 2B:
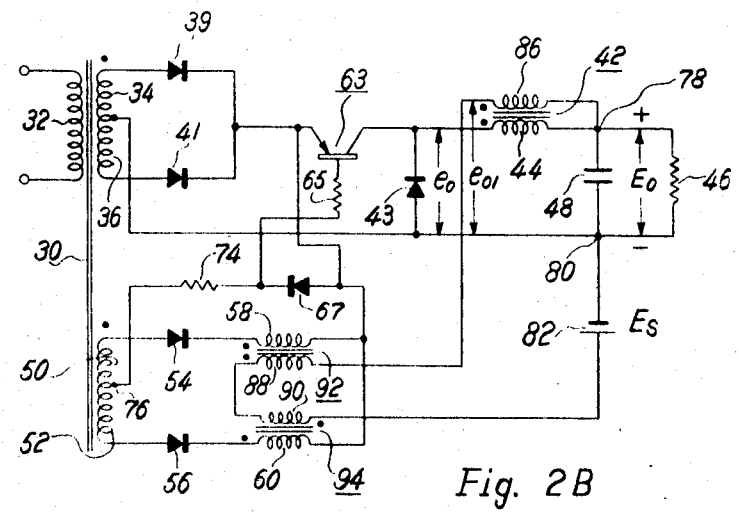
FIGURE 2B is a connection-diagram for illustrating an embodiment of this invention applied to form a single-phase full-wave rectifying circuit in which a PNP transistor is used as an electronic switching element.

FIGURE 2B shows a modification of the embodiment of FIGURE 2A, in which a switching transistor 63 of PNP type is employed as the electronic switching elements. In this embodiment, the rectified output of the SR typed rectifying circuit returns, through a diode 67 and a resistor 74 connected in series to each other, to the neutral point 76 of the secondary winding (50, 52); the output side of rectifiers 39 and 41 is connected to the emitter of the transistor 63 and to the rectified output of the SR typed rectifying apparatus; the connection point between a silicon diode 67 and the resistor 74 is connected, through a resistor 65, to the base of the transistor 63; and the collector of the transistor 63 is connected to the winding 44 of the choke-coil 44. As the result of the above-mentioned arrangement, the current flowing through the resistor 74 in case of the saturation of the saturable reactors 92 and 94 induces a voltage across the silicon diode 67. In this case, the higher potential of the induced voltage is applied to the emitter of the transistor 63, and the lower potential of the induced voltage is applied, through the resistor 65, to the base of the transistor 63. The transistor 63 becomes conductive by the induced voltage and the regulated rectified DC output is applied to the choke-coil 42. A diode 43 is employed to continue the current of the choke-coil 42 at the cut-off period of the transistor 63.

Figure 3:
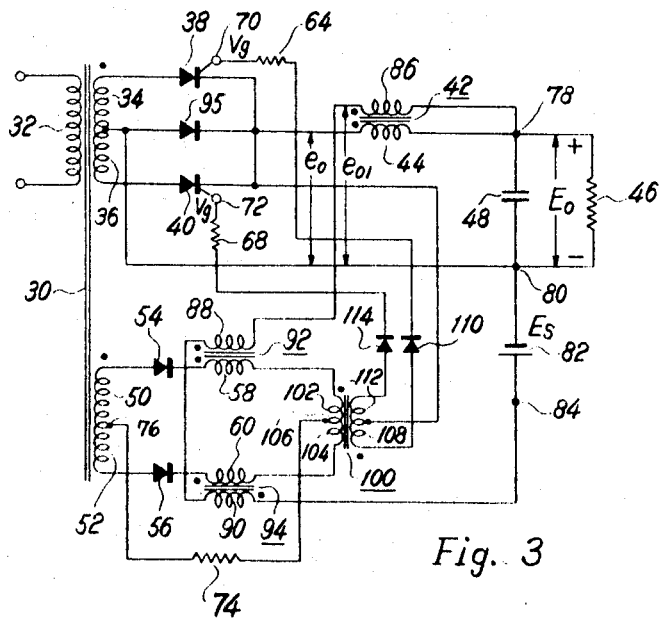

Another embodiment of this invention applied to form a single-phase full-wave rectifying circuit will be described with reference to FIGURE 3. Since equivalent parts operating in the similar ways as the parts of the embodiment shown in FIGURE 2 are designated by the same reference numeral as to one another, duplicate description as to such equivalent parts is omitted. In this embodiment, the output currents of the saturable reactors 92 and 94 are introduced to a primary winding (102 and 104) of a transformer 100 and then returns from a neutral point 106 of the primary winding (102, 104), through a resistor 74, to a neutral point 76 of the secondary winding (50, 52). Terminals of the secondary winding (108, 112) of the transformer 100 are introduced respectively to the control electrode 70 and 72 of the respective silicon controlled rectifiers 38 and 40, through a series-connection of a diode 110 and a resistor 64 and a series-connection of a diode 114 and a resistor 68.

In the above-mentioned arrangement, a positive pulse is induced across the secondary winding 108 every abrupt increase of the current occurring in response to the saturation of the saturable reactor 92 and applied, through the diode 110 and the resistor 64, to the control electrode 70 of the silicon controlled rectifier 38 to ignite it. By the similar ways, an ignition signal Vg obtained through a secondary winding 112, the diode 114 and the resistor 68 ignites the silicon controlled rectifier 40.

Figure 4:
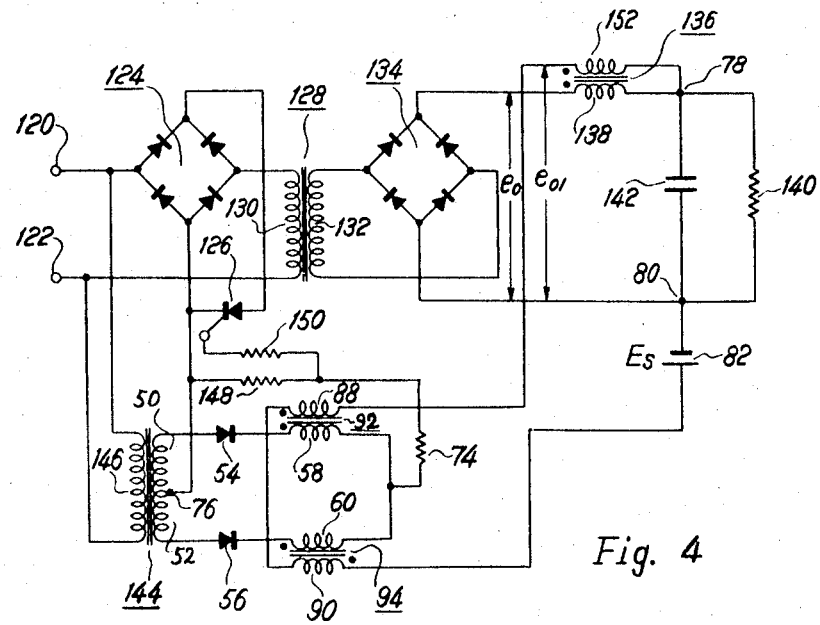
FIGURE 4 is a connection-diagram for illustrating an embodiment of this invention applied to form a single-phase full-wave rectifying circuit of bridge type.

With reference to FIGURE 4, another embodiment of this invention applied to form a single-phase full-wave rectifying circuit will be described. In this embodiment, a greater part of AC power supplied from input terminals 120 and 122 is applied, through a diode-bridge 124 and a silicon controlled rectifier 126, to the primary winding 130 of a transformer 128. An AC voltage induced across the secondary winding 132 of the transformer 128 is rectified by a diode-bridge 134 and then applied, through the main winding 138 of a choke-coil 136, to a load 140. A condenser 142 is employed as a smoothing condenser.

On the other hand, another part of AC power supplied from the input terminals 120 and 122 is introduced to the primary winding 146 of a transformer 144. A secondary winding (50, 52), diodes 54 and 56, saturable reactors 92 and 94 and a resistor 74 acts as equivalent parts designated by the same reference numerals as those of the FIGURE 2. The current of the resistor 74 is divided into resistors 148 and 150. The ignition of the silicon controlled rectifier 126 is carried out by use of abrupt increase of the current flowing through the resistor 150 occurring in response to the saturation of the saturable reactors 92 and 94. Both of the divided currents return to the neutral point 76 of the secondary winding (50, 52). In more particular description, either the saturable reactor 92 or 94 reaches to its saturation condition every half cycle of the input AC, and the silicon controlled rectifier 126 is ignited every half cycle of the AC. The constitution and operation of the control circuit comprising the reference DC voltage source 82, respective auxiliary windings 88 and 90 of the saturable reactors 92 and 94, and the auxiliary winding 152 of the choke-coil 136 are the same as those of the embodiment shown in FIGURES 2 so that details are omitted.

Figure 5A:
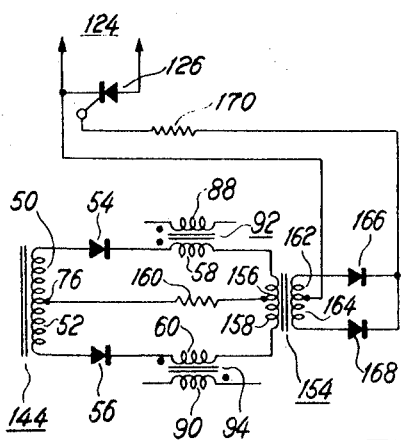
FIGURE 5A is a connection-diagram for illustrating a modification of an ignition circuit to be used in the embodiment shown in FIGURE 4.

In FIGURE 5A, only the ignition circuit of the silicon controlled rectifier 126 formed by use of a pulse transformer 154 is illustrated to indicate that such ignition circuit can be also applied to the embodiment of FIGURE 4. In this arrangement, equivalent parts are designated by the same reference numerals as to one another. Currents of the saturable reactors 58 and 60 return to the neutral point 76 of the secondary winding of the transformer 144 through a primary winding 156 or 158 of the pulse transformer 154. Pulsive voltages occurring respectively in response to saturation conditions of the saturable reactors 92 and 94 are induced at respective secondary windings 162 and 164 of the pulse transformer 154 and applied, through a diode 166 or 168 and a resistor 170, to the silicon controlled rectifier 126 to ignite it.

Figure 5B:
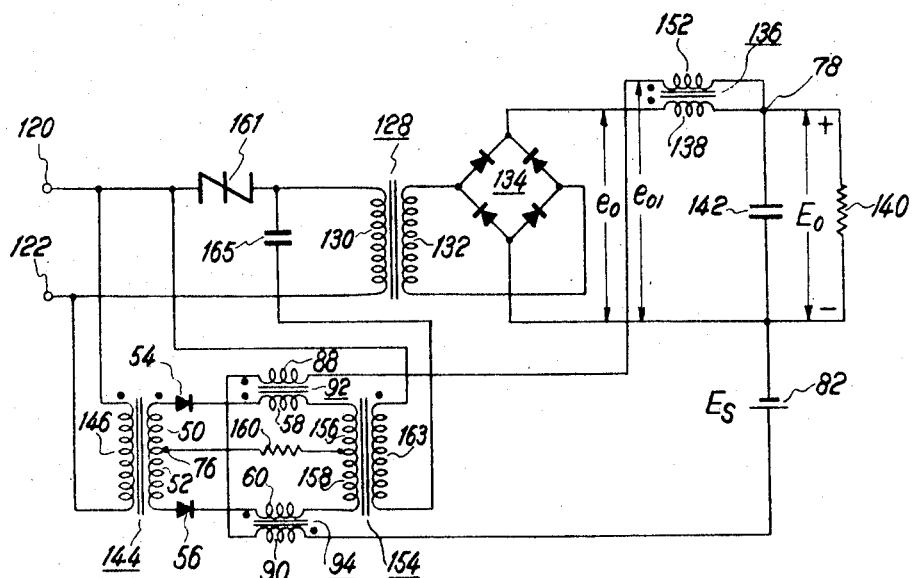
FIGURE 5B is a connection-diagram for illustrating another embodiment of this invention applied to form a single-phase full-wave rectifying circuit of bridge type in which a bidirectional diode thyristor is employed as an electronic switching element.

With reference to FIGURE 5B, another embodiment of this invention to form a single-phase full-wave rectifying circuit in which a silicon symmetrical switch (bidirectional diode thyristor) is employed as electronic switching element. This electronic switching element 161 called as "SSS" has such a break-down characteristic for dual directions that the element is not conductive up to a certain critical value of applied voltage in both polarity and changes abruptly to its conduction condition if the applied voltage exceeds the critical value (break-down voltage). Accordingly, if a voltage exceeding the break-down voltage is instantaneously applied to the element, this element 161 becomes conductive in the direction of the polarity of the applied voltage, and this conductive condition continues until the polarity of the applied voltage is reversed. In this embodiment, since equivalent parts as those of the embodiments shown in FIGURES 4 and 5A are designated by the same reference numerals, only the constitution and operation of the ignition circuit as to the element 161 are described. An abrupt change of the voltage across the primary winding 156 or 158 of a pulse transformer 154 occurs in response to the saturation of the saturable reactor 92 or 94 and is stepped up at the secondary winding 163 of the transformer 154. This stepped-up voltage is applied to two electrodes of the element 161 through a condenser 165. If this applied voltage reaches the break-down voltage, the element becomes conductive in the polarity of the applied voltage and supplies power to excite a transformer 128. In case where the level of the output pulse induced across the secondary winding 163 is not sufficient for the break-down voltage, the induced output pulse may be amplified to obtain a sufficient break-down voltage.

Figure 6:
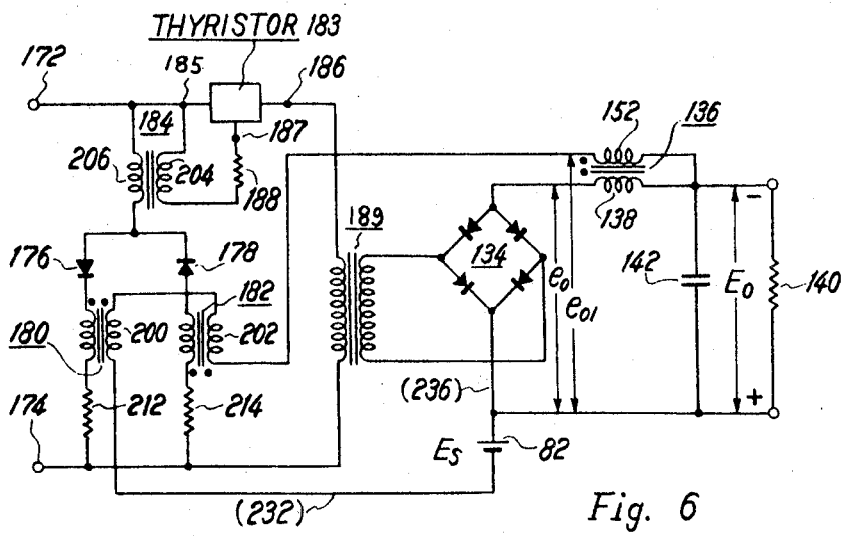
FIGURE 6 is a connection-diagram for illustrating another embodiment of this invention applied to form a single-phase full-wave rectifying circuit of bridge type which a bidirectional triode thyristor is employed as an electronic switching element.

FIGURE 6 shows another embodiment of this invention applied to form a single-phase full-wave rectifying circuit by use of a bidirectional triode thyristor 183. In this embodiment, a greater part of AC power supplied from input terminals 172 and 174 is applied, through the thyristor 183 and a transformer 189, to a bridge rectifier 134, and the rectified output is then applied to a load 140 through the main winding 138 of a choke-coil 136. On the other hand, another part of AC power supplied from the input terminals 172 and 174 is applied to a series-connected control circuit comprising the primary winding 206 of a pulse transformer 184, a diode 176 or 178, saturable reactor 180 or 182 and a resistor 212 or 214. It is desirable that the resistors 212 and 214 have substantially the same resistance as to each other. In response to the saturation of the saturable reactor 180 or 182, half-wave rectified currents flow respectively through the diodes 176 and 178 and then flow into the primary winding 206 of the pulse transformer 184. A voltage induced across the secondary winding 204 is applied, through a resistor 188, to electrodes 185 and 187 of the thyristor 183. If an ignition voltage is applied between electrodes 185 and 187 of the thyristor 183 in either direction, the thyristor 183 becomes in either direction between electrodes 185 and 186. On the contrary, while there is no ignition voltage across the electrodes 185 and 187, the path between the electrodes 185 and 186 is hold at the non-conduction condition. In other words, the thyristor 183 assumes a high impedance in dual directions in case of no ignition voltage, while it becomes conductive in response to a voltage induced across the secondary winding 204 of the pulse transformer 184 and it supplies power to the rectifier 134. The firing angle of the thyristor 183 is controlled by regulating the demagnetization of the saturable reactors 180 and 182. The regulation of these demagnetizations is carried out by applying, to a control circuit comprising an auxiliary winding 152 of the choke-coil 136 and respective control windings 200 and 202 of the saturable reactors 180 and 182, a difference voltage between the rectified DC output Eo and the reference DC voltage Es of the reference DC voltage source 82. As the result of the above-mentioned operation, the rectified DC output voltage Eo is stabilized at a value substantially equal to the reference DC voltage Es.

Figures 7, 8:
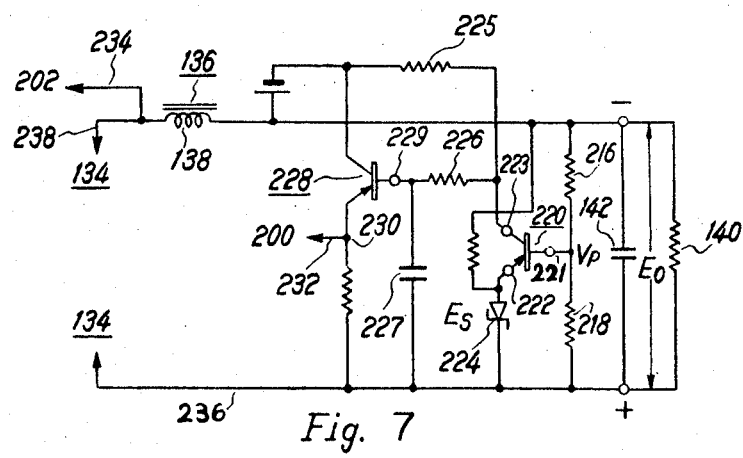
FIGURE 7 is a connection diagram for illustrating another control circuit to be applied to the embodiment of FIGURE 6.
FIGURES 8 and 9 are connection-diagrams for illustrating respectively embodiments of this invention applied to form a three-phase full-wave rectifying circuit.

FIGURE 7 illustrates modified parts of the embodiment shown in FIGURE 6. In this modification, a voltage P proportional to the rectified DC output voltage Eo is picked up by use of a voltage divider comprising resistors 216 and 218 and then applied to the base 221 of a transistor 220. The voltage Es of a reference diode 224 is applied to the emitter 222 of the transistor 220, so that the collector current of the collector 223 is controlled in accordance with the value of a difference between two applied voltages Vp and Es. The terminal voltage of the collector 223 is applied, through a time-delay circuit comprising a resistor 226 and a capacitor 227, the base 229 of a transistor 228 which operates as "emitter follower amplifier." In case of applying this modified circuit to the embodiment shown in FIGURE 6, lines 236 and 238 are connected to the bridge rectifier 134; the emitter 230 of the transistor 228 is connected to the control winding 200 of the saturable reactor 180 by use of a line 232; and a line 234 is connected to a control winding 202 of the saturable reactor 182. Since voltages appearing at the base 221 of the transistor 220 and at the emitter 230 of the transistor 228 deviate in opposite polarities to each other and the rectified DC output Eo follows with the voltage of the emitter 230, this rectifying circuit has the negative feed-back function in which "hunting" is liable to occur. However, since a circuit (226 and 227) having a relatively large time constant is employed in this arrangement, it can be realized to suppress such "hunting," to stabilize the fluctuation of the rectified DC output voltage Eo due to external disturbances, and to make the response time shorter. In other words, the emitter voltage of the transistor 228 is always stabilized at a substantially constant voltage in the operation condition. As the result of this operation, the potential of the emitter 232 acts as the equivalent means as the reference DC voltage source 82. In this arrangement, the following equation is valid:

$$KEo \doteqdot Es$$

where

Eo: the reference DC output voltage
Es: the voltage of the reference diode 224
K: the dividing ratio of the voltage divider comprising resistors 216 and 218.

With reference to FIGURE 8, an embodiment of this invention applied to form a three-phase full-wave rectifying apparatus of this invention will now be described. In this embodiment, a smoothing circuit is omitted for simple illustration. Three-phase AC voltages applied from input terminals 302, 304 and 306 are rectified as to full-wave by use of six silicon controlled rectifiers 308 to 318, and the rectified DC output voltage is obtained from output terminals 320 and 322. These rectifiers 308 to 318 are ignited by ignition signals supplied from three SR-typed rectifying circuits which correspond respectively to three phases of AC source and have the same formation as to one another. Accordingly, the formation and operation of the SR-typed rectifying circuit only as to the input terminal 302 will be described to simplify the explanation.

The AC from the input terminal 302 is applied, through a primary winding 326 of a pulse transformer 324, to a series-connection comprising a main winding 332 of a saturable reactor 328 and a diode 336 connected to a line 340 and a series-connection comprising main winding 334 of a saturable reactor 330 and a diode 338 connected to a line 342. These lines 340 and 342 are respectively connected to terminals of a dummy load 344 of the SR-typed rectifying circuit. An ignition signal generated in response to the saturation of the saturable reactor 328 is applied, through a secondary winding 336 of the saturable reactor 324, a diode 338 and a resistor 340, to the silicon controlled rectifier 308 to ignite it. On the other hand, an ignition signal generated in response to the saturation of the saturable reactor 330 is applied, through a secondary winding 342, a diode 344 and a resistor 346, to the silicon controlled rectifier 314 to ignite it. In order to regulate the firing angle of the saturable reactors 328 and 330, a difference voltage between the DC output voltage Eo across output terminals 320 and 322 and the reference DC voltage Es of a reference DC voltage source 348 is applied to a series-connection of respective control windings 350 and 352 of the saturable reactors 328 and 330. Ignition circuits of respective rectifying circuits connected to input terminals 304 and 306 have the similar formation and carry out the similar operation as to the above-mentioned ignition circuit.

In the operation of this embodiment, the ignition signals are so generated that each of the six silicon controlled rectifiers 308 to 318 has a firing angle suitable to make the average value Eo of the rectified output voltage $e_0$ equal to the reference DC voltage Es. Since the exact ignition signals are obtained from the SR-typed rectifying circuit even if the silicon controlled rectifiers 308 to 318 are almost non-loaded, the ignitions of the respective silicon controlled rectifiers 308 to 318 are exactly carried out. Accordingly, stable operation in keeping with equilibrium is attained by this embodiment.

Moreover, if necessary, the three silicon controlled rectifiers 308, 310 and 312 may be replaced by ordinary diodes so that the rectified DC output is regulated by other three silicon controlled rectifiers 314, 316 and 318.

Figure 9:
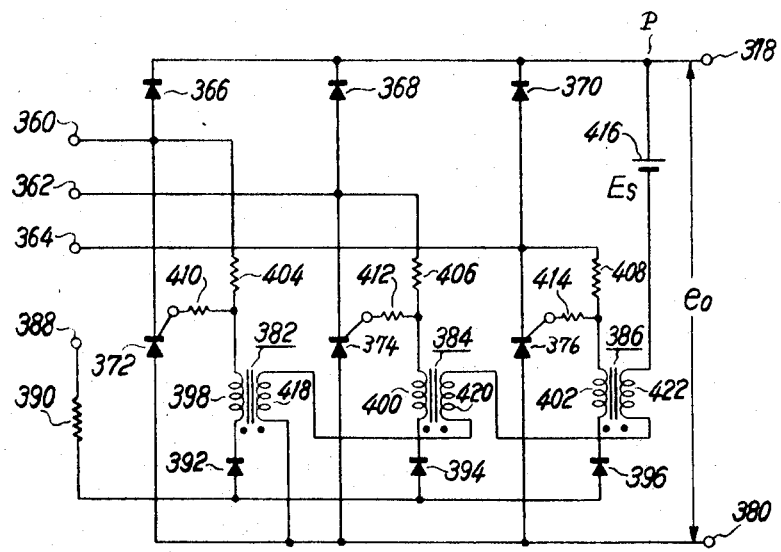

With reference to FIGURE 9, another embodiment of this invention to form a three-phase full-wave rectifying circuit will be described. In this embodiment, a smoothing circuit is not shown for simple illustration. Three-phase AC voltages supplied from input terminals 360, 362 and 364 are rectified by use of three diodes 366, 368 and 370 and three silicon controlled rectifiers 372, 374 and 376. The rectified DC output voltage $e_0$ appears across output terminals 378 and 380. To stabilize the average value Eo of the rectified DC output voltage $e_0$, respective firing angles of the silicon controlled rectifiers 372, 374 and 376 is regulated by a SR-typed rectifying circuit provided with saturable reactors 382, 384 and 386. The SR-typed rectifying circuit is formed in such a manner that the neutral point 388 of three-phase AC is connected to diode 392, 394 and 396 through a resistor 390, and that three diodes 392, 394 and 396 are connected respectively, through respective main winding 398, 400 and 402 of saturable reactors 382, 384 and 386 and resistors 404, 406 and 408, to input terminals 360, 362 and 364 of respective phases. Respective magnetization currents of the saturable reactors 382, 384 and 386 are divided by respective resistors 410, 412 and 414 and ignite corresponding silicon controlled rectifiers 372, 374 and 376. A difference voltage between the rectified DC output $e_0$ and the reference DC voltage Es of a reference DC voltage source 416 is applied, as a control signal for stabilization, to a series-connection of the respective control windings 418, 420 and 422 of the saturable reactors 382, 384 and 386, so that the average value Eo of the rectified DC output $e_0$ becomes substantially equal to the reference DC output Es.

Figure 10:
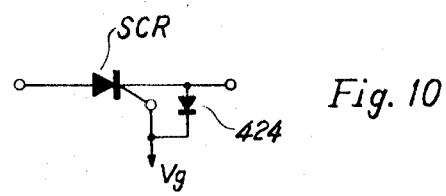
FIGURE 10 is a connection-diagram for illustrating a modification of the circuitry as to silicon controlled rectifier (SCR) to be applied to the embodiments of this invention.

In each of the above-mentioned embodiments, the periphery circuitry of the silicon controlled rectifiers may be modified to a degree. In the embodiment of FIGURE 2A by way of example, it is allowable that the resistors 62 and 66 become to "open state" (maximum resistances) and the resistors 64 and 68 become to "short state" (minimum resistance), or that both of the resistors 62 and 66 are replaced by the diodes respectively so as to utilize their characteristics of forward direction. Moreover, a diode 424 may be connected across the plus and control electrodes of a silicon controlled rectifiers, as shown in FIGURE 10, in all the embodiments to avoid inverse overpotential applied to the control electrode of the silicon controlled rectifier.

Figure 11:
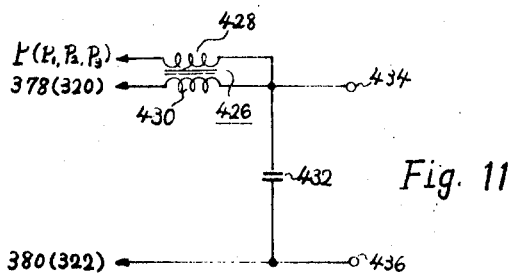
FIGURE 11 is a connection-diagram for illustrating a smoothing circuit to be applied to each of the embodiments shown in FIGURES 8 and 9.

In case of applying a smoothing circuit of choke-input type to each of outputs of embodiments shown in FIGURES 8 and 9, the choke-coil (426) may be provided with an auxiliary winding (428) as shown in FIGURE 11. In this case, a corresponding joint P or joints $P_1$, $P_2$ and $P_3$ is/are departed in FIGURE 9 or 8 to connect the auxiliary winding 428 to the series connection of the reference DC source 416 (or 348) and the group of auxiliary winding 418, 420 and 422 (or 350 and 352 etc.). The rectified output voltage smoothed by use of the main winding 430 of the choke-coil 426 and a capacitor 432 is obtained from output terminals 434 and 436.

Furthermore, the suppression magnitude (volt·second) of the main winding (e.g.; main windings 58 and 60 of the saturable reactors 92 and 94) of a saturable reactor can be reduced by inserting an auxiliary reactor in series with the series-connection of the control windings (88, 90) of the saturable reactors (92, 94). A smoothing circuit of any type, such as choke-input type or condenser-input type, can be adopted. In case of the choke-input type smoothing circuit, one terminal (to be connected to one of the output terminals) of a series-connection comprising auxiliary windings of the saturable reactors is directly connected to the input terminal (the terminal of the rectified DC output) of the choke-coil without providing with the auxiliary winding of the choke-coil as are illustrated in each of FIGURES 2A, 2B, 3, 4, 5B and 6. However, in case of providing with the auxiliary winding of the choke-coil as is illustrated in each of the above-mentioned embodiment, the effect of the fluctuation of the rectified DC output appearing in the regulation function of the control circuit of said saturable reactors in accordance with the DC resistance of the choke coil is removable. Since the stabilized DC output voltage $E_o$ is a constant voltage proportional to the reference voltage $E_s$ as is mentioned above, it is apparent that the DC output voltage $E_o$ is variable in accordance with variable adjusting of the reference DC voltage $E_s$.

What we claim is:

1. An apparatus for generating a constant direct current output into a load from an alternating source comprising: a main rectifying circuit including a controlled unidirectional means coupled between said source and said load; a series choke-coil having a main winding coupled in series between said unidirectional means and said load, and having an auxiliary winding coupled to said main winding; an auxiliary circuit generating a second direct current output including a saturable means having a primary and a control circuit, said primary circuit coupled to control said unidirectional means and to control said second direct current output; means generating a reference voltage coupled in series with said load and said control circuit, and said auxiliary winding coupled to said load and to said control circuit; whereby when said direct current output voltage varies from said reference voltage said auxiliary circuit will control said saturable means which in turn will control said unidirectional means to restore said output voltage equal to said reference voltage without a large time constant and therefore without hunt.

2. A rectifying apparatus as set forth in claim 1, wherein said saturable means comprises a saturable reactors and in which said auxiliary rectifying circuit includes two directional circuits, means coupling said directional circuit to said AC source and said directional circuits including one of first and second diodes and said main winding of said saturable reactor connected in series to each other.

3. A rectifying circuit as set forth in claim 2, in which said main rectifying circuit controlled unidirectional means includes two silicon controlled rectifiers coupled to said AC source.

4. A rectifying circuit as set forth in claim 3, in which soid coupling means has a neutral point and further comprising a first plurality of resistances coupling said auxiliary rectifying circuit to said neutral point through resistances, and a second plurality of resistances coupling said auxiliary rectifying circuit to respective control electrodes of said silicon controlled rectifiers as said control signals.

5. A rectifying circuit as set forth in claim 3 further comprising a transformer and a pair of diode-resistor series circuits and in which the output of said auxiliary rectifying circuit is connected to the primary winding of said transformer, and the secondary winding of said transformer is coupled through said diode-resistor pair respectively to the respective control electrodes of said two silicon controlled rectifiers as said control signals.

6. A rectifying apparatus as set forth in claim 2, wherein said AC source has a neutral point and in which said main rectifying circuit comprises third and fourth diodes each having two terminals, one terminal of each being connected respectively in the same direction to said AC source, a PNP transistor having a base, collector and emitter, said emitter being connected to the remaining terminals of said third and fourth diodes and said collected being connected to said main winding of said choke-coil, and a fifth diode inserted between said collector and said neutral point of said AC source, and said auxiliary rectifying circuit output is connected to said neutral point through a series-connection comprising a diode and a resistor and the voltage across said diode is applied between said emitter and said base of said transistor.

7. A rectifying apparatus as set forth in claim 2, in which said main rectifying circuit comprises a first bridge rectifier and further comprising a regulation circuit coupled to said AC source and a second transformer inserted between said regulation circuit and said bridge rectifier to supply regulated AC power to the bridge rectifier.

8. A rectifying apparatus as set forth in claim 7, in which said AC source having a neutral point and further comprising a silicon-controlled rectifier, said regulation circuit comprises a regulating second bridge rectifier having said AC power applied through the primary winding of said second transformer and a silicon-controlled rectifier being connected to said neutral point and a resistor, a bleeder resistor having a division point coupled to said resistor, said bleeder resistor coupling said output of said auxiliary rectifying circuit to said neutral point, said division point resistor being connected to the control electrode of said silicon controlled rectifier.

9. A rectifying apparatus as set forth in claim 7, wherein said AC source has a neutral point and further comprising a third transformer, and a controlled rectifier having a control terminal, a resistor and a plurality of diodes in which said regulation circuit comprises a regulating bridge rectifier having the AC power applied through the primary winding of the second inserted transformer and said silicon-controller rectifier being connected to said neutral point and in which the output of said auxiliary rectifying circuit is connected to the primary winding of said third transformer and the secondary winding of said transformer is coupled through said diodes and said resistor to the control electrode of said controlled rectifier.

10. A rectifying apparatus as set forth in claim 7 further comprising a third transformer and a condenser in which said regulation circuit comprises a bidirectional diode thyristor to which said AC source is coupled through the primary winding of said second inserted transformer, and in which the output of the auxiliary rectifying circuit is applied to the primary winding of said third transformer, the secondary winding of said third transformer is applied, through said condenser, to electrodes of said thyristor.

11. A rectifying apparatus as set forth in in claim 7 further comprising an auxiliary transformer and in which the regulation circuit comprises a bidirectional triode thyristor having a control electrode to which said AC source is coupled throught the primary winding of said inserted second transformer, and in which the AC source is coupled to the primary winding of said auxiliary transformer and to said two directional circuits of said auxiliary rectifying circuit, and the secondary winding of said auxiliary transformer is coupled between the control electrode and either remaining electrode of the thyristor.

12. An apparatus as set forth in claim 1 further comprising three auxiliary transformers and in which the main rectifying circuit comprises six silicon-controlled rectifiers connected into a bridge rectifier, and the auxiliary rectifying circuit comprises six unidirectional circuits which are connected through the respective primary windings of said three auxiliary transformers to said AC source defining a bridge rectifier and each of which comprises a diode and said main winding of said saturable reactor connected in series to each other, and in which each of three sets of said reactors fed from said AC supply terminals is employed as a group of reactors, and the potential across the secondary winding of each of said auxiliary transformers is applied to the control electrode of the corresponding one of said silicon-controlled rectifiers through said diode and a resistor.

13. An apparatus as set forth in claim 12 in which the rectified DC output voltage is applied to said load through a smoothing circuit defined by said choke-coil which is provided with an auxiliary winding, and in which said auxiliary winding of said choke-coil is coupled to said series connection of the auxiliary windings of said group of saturable reactor.

14. A rectifying apparatus as set forth in claim 1, wherein said source has a neutral point and in which said main rectifying circuit comprises three diodes and three silicon-controlled rectifiers formed into a bridge rectifier, and the auxiliary rectifying circuit comprises three unidirectional circuits which are connected respectively between said AC source and the neutral point of said AC source through respective resistors and each of which is composed of a diode and the primary winding of said saturable means connected in series to each other, and in which all of said saturating means are employed as a group and potentials of the resistors are applied to the control electrode of corresponding one of the silicon-controlled rectifiers.

15. An apparatus as set forth in claim 14 in which the rectified DC output voltage is applied to said load through a smoothing circuit comprising a choke-coil which is provided with an auxiliary winding, and in which the difference voltage is applied to said series connection of the control windings of said group of saturable reactors which are series connected to each other and to said auxiliary winding of said choke-coil.

References Cited

UNITED STATES PATENTS

| | | | |
|---|---|---|---|
| 3,241,035 | 3/1966 | Rhyne | 321—47 XR |
| 3,207,975 | 9/1965 | Pintell | 321—16 XR |
| 3,218,540 | 11/1965 | Jackson | 321—18 |
| 3,348,130 | 10/1967 | Jensen | 321—18 XR |
| 3,373,337 | 3/1968 | Han-Min Hung | 321—16 |

JOHN F. COUCH, *Primary Examiner.*

W. M. SHOOP, JR., *Assistant Examiner*

U.S. Cl. X.R.

321—47